United States Patent [19]
Kang

[11] Patent Number: 5,513,024
[45] Date of Patent: Apr. 30, 1996

[54] LIQUID CRYSTAL DISPLAY AND METHOD FOR MAKING THE SAME

[75] Inventor: Jin-Kyu Kang, Kyunggi-do, Rep. of Korea

[73] Assignee: Samsung Display Devices Co., Ltd., Kyunggi-do, Rep. of Korea

[21] Appl. No.: 146,911

[22] Filed: Nov. 1, 1993

[30] Foreign Application Priority Data

Dec. 4, 1992 [KR] Rep. of Korea .................. 92-23338

[51] Int. Cl.$^6$ .................. G02F 1/1335; G02F 1/333
[52] U.S. Cl. .................. 359/62; 359/82
[58] Field of Search .................. 359/62, 82

[56] References Cited

U.S. PATENT DOCUMENTS 4,150,878 4/1979 Bartilai et al. .................. 359/82
5,296,096 3/1994 Enomoto et al. .................. 437/181

Primary Examiner—Anita Pellman Gross
Assistant Examiner—Fetsum Abraham
Attorney, Agent, or Firm—Christie, Parker & Hale

[57] ABSTRACT

In order to make the display of an LCD clearer than before, this invention provides an LCD which has a uniform cell gap between two soda lime glass substrates, which can be achieved by providing glass substrates having grooves on the outer surfaces. Further, this invention provides a method for making the same, comprising the steps of: applying a photoresister on the outer surfaces of two soda lime glasses each of which has an indium tin oxide transparent electrode layer or orientation layer; exposing the applied glasses to light through a mask; etching the exposed glasses to produce a pattern on the glasses; etching the patterned soda lime glasses with a hydrogen fluoride solution to produce glasses having grooves.

9 Claims, 3 Drawing Sheets

LIQUID CRYSTAL DISPLAY AND METHOD FOR MAKING THE SAME

BACKGROUND OF THE INVENTION

1. Field of the Invention

This invention relates to a liquid crystal display ("LCD") and method for making the LCD.

2. Description of the Prior Art

An LCD is a substantially a flat display which generally has two conducting plates up filled up by dielectric anisotropic liquid crystal the LCD displays a picture such as a letter, a number and the like by using variation of characteristics of reflecting light in accordance with variation of applied voltage.

This kind of LCD has two glass substrates facing each spacers therebetween for forming a space in a predetermined gap which is filled up by the liquid crystal, which will be described more in detail.

At each inner surface of two parallel transparent glass substrates a transparent electrode layer of indium tin oxide ("ITO") and an orientation layer determining the dielectric anisotropy of the liquid crystal are applied in order.

The transparent electrode layer of ITO has a certain distribution pattern. One of the glass substrates has a common electrode and the other has a segment electrode.

A sealant covers the peripheral area of the inner surface of one of the substrates except for an area for receiving the liquid crystal, which is then sintered to produce a liquid crystal cell.

At the inner side of the liquid crystal cell spacers are inserted for maintaining a constant cell gap between the substrates. And the cell gap is filled by the liquid crystal through an opening, then the opening is sealed by the sealant.

At an outer surface of each substrate a polarizer is adhered for effective display, When voltage is applied to this kind of an LCD, the transparent electrode layers inside the two glass substrates form an electric field, resulting the dielectric anisotropy of the liquid crystal molecules between the substrates being twisted in the direction determined by the orientation layer and thereby refracting light from the outside. As a result, the molecules lying at the intersection point where the applied common electrode and the applied segment electrode meet permit the light to pass, so a picture is displayed.

In the case of a big LCD of the above described LCDs, for example, bigger than 8", it is necessary to minimize the thickness of the substrate, but it is difficult to maintain the cell gap.

In this conventional LCD, after the sealant and the spacers are formed on a substrate, the substrates are pressed under high temperature by a hot presser, and then the sealant and the spacers are pressed at the same time. After the pressure is released, the spacers attempt to recover their initial configuration but the sealant attempts to maintain the sintered condition.

Further, in the case of an STN (super twisted nematic) LCD, the rate of expansion of a soda lime glass, which is mostly used as a substrate is approximately twice that of thermoplastic sealant, which is the main reason for error in the cell gap.

Therefore, the cell gap in the central part is greater than that in the periphery, which makes the picture unclear.

In order to solve the above-described problem, a spacer coated with an adhesive is proposed, but the adhesive chemically reacts with dielectric anisotropic liquid crystal. Therefore, it is difficult to put it to practical use.

SUMMARY OF THE INVENTION

As described above, an object of the present invention is to provide an improved LCD which has an uniform cell gap and a better display.

Another object of the present invention is to provide a method for making the LCD.

To achieve the above objects, the present invention provides an LCD comprising: spacers; a sealant; dielectric anisotropic liquid crystal; two transparent soda lime glass substrates having grooves in the outer surfaces for reducing the transformation of the substrates.

Further, the present invention provides a photolithography process for making the LCD comprising the steps of: applying a photoresister on the outer surfaces of two soda lime glasses each of which has an ITO transparent electrode layer or an orientation layer; exposing the applied glasses to light through a mask; etching the exposed glasses to produce a pattern on the glasses; etching the patterned soda lime glass with a hydrogen fluoride solution to produce the glasses having grooves.

DETAILED DESCRIPTION OF THE PREFERRED EMBODIMENTS

Figure 1:
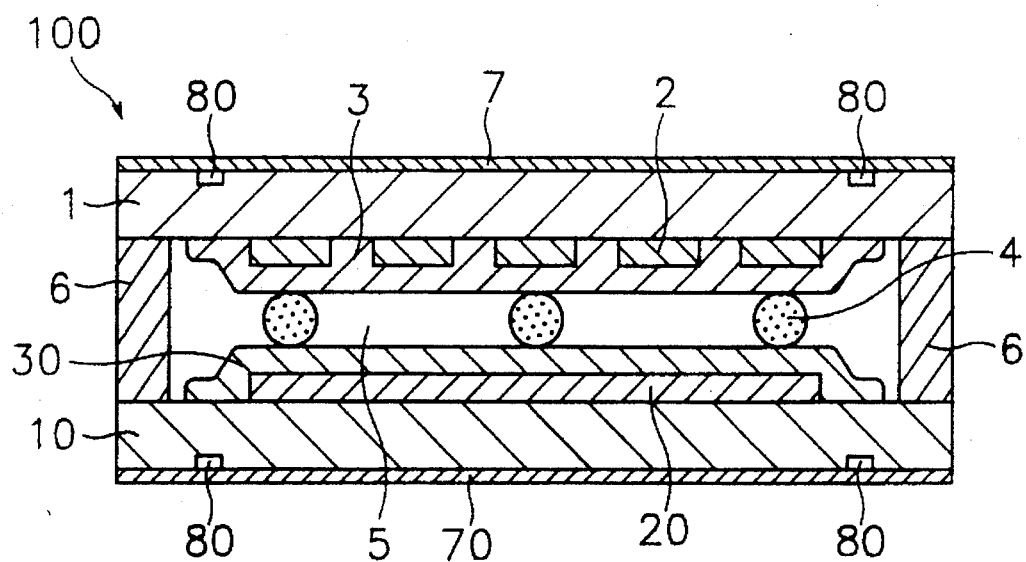
FIG. 1 is a sectional-side elevation view illustrating an embodiment of an LCD according to the present invention.

A liquid crystal display and a method for making the same will be described in detail with reference to the drawings. Like reference numerals and letters designate like parts throughout the specification.

FIG. 1 is a sectional-side elevation view illustrating an embodiment of an LCD according to the present invention.

As illustrated in FIG. 1, an LCD according to the present invention has ITO transparent electrode layers 2 and 20, a segment electrode, and a common electrode respectively, and orientation layers 3 and 30 determining the characteristics of dielectric anisotropy of a liquid crystal, between two parallel transparent soda lime glass substrates 1 and 10.

Spacers 4 are scattered between the glass substrates 1 and 10 to maintain the gap therebetween. A sealant 6 is printed on the periphery of the inner surface of one of the glass substrates 1 and 10 and sintered to produce a liquid crystal cell 100 and produce a space 5 for liquid crystal is formed between the glass substrates 1 and 10.

Polarizers 7 and 70 are adhered to the outer surfaces of the glass substrates 1 and 10 respectively.

An LCD according to the present invention, has glass substrates 1 and 10 having grooves 80 on the periphery of the outer surfaces thereof to refrain transformation of the glass substrates 1 and 10 resulting from pressing the liquid crystal cell 100 under high temperature.

Figure 2:
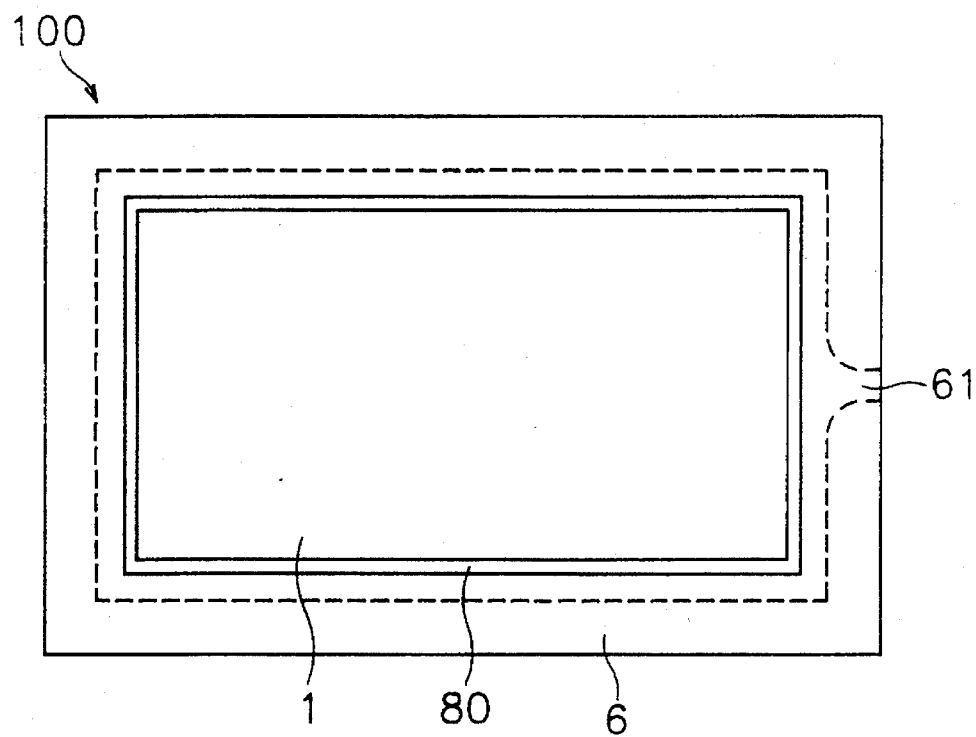
FIG. 2 is a plan view illustrating the embodiment of the LCD according to the present invention.

FIG. 2 is a plan view of an LCD without polarizers according to an embodiment of the present invention.

As illustrated in FIG. 2, each groove 80, for preventing the substrates 1 and 10 from warping, has a continuous rectangular shape inside of the sealant 6 formed on the periphery of the substrates except an area 61 for receiving the liquid crystal.

When each surface of the substrates 1 and 10 has a square configuration or other configuration, the sealant 6 has a corresponding configuration and the grooves 80 are formed in the corresponding configuration inside of the sealant 6.

Figure 3:
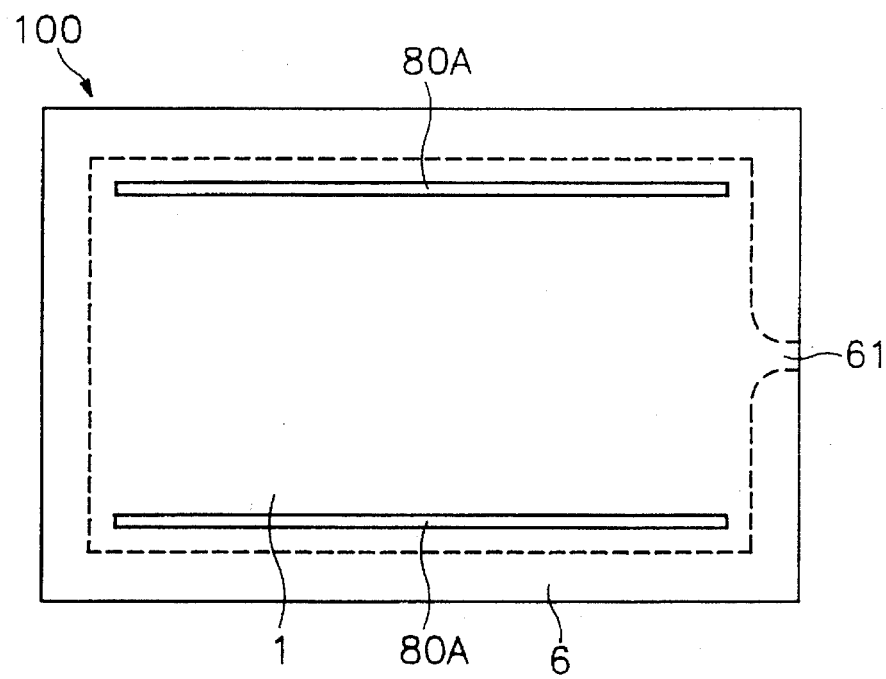
FIG. 3 is a plan view illustrating another embodiment of an LCD according to the present invention.

FIG. 3 is an plan view of an LCD without polarizers illustrating another embodiment according to the present invention.

Since the rate of expansion during the assembling process is greatest along the long sides of the substrates 1 and 10, as illustrated in FIG. 3, grooves 80A are formed in the shape of two parallel lines along the long sides of the substrates 1 and 10, and the sealant, as shown in the previous embodiment.

A method for making the LCD described above is illustrated in FIGS. 4A, 4B and 4C.

Figure 4A:
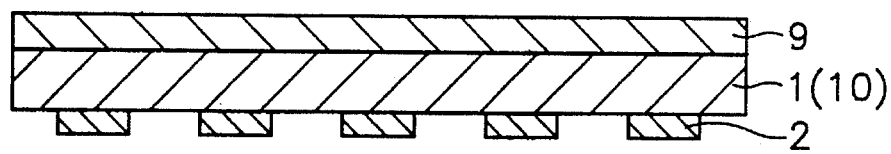
FIGS. 4A, 4B, and 4C are sectional-side elevations views of a process illustrating a method for making the LCD according to the embodiments of the present invention.

In FIG. 4A, a sensitive emulsion 9, for example a photoresister, is applied on the outer surface of a soda lime glass substrate 1, while the ITO transparent electrode layer 2 is formed on the inner surface of the substrate 1.

Figure 4B:
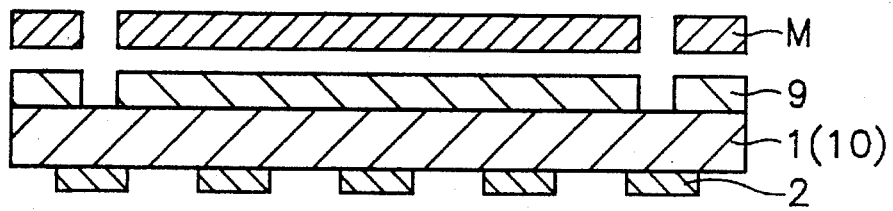

In FIG. 4B, the sensitive emulsion 9 is exposed to light through a mask and eroded, and then parts of the sensitive emulsion 9 where the grooves will be formed is removed to produce a certain pattern.

Figure 4C:
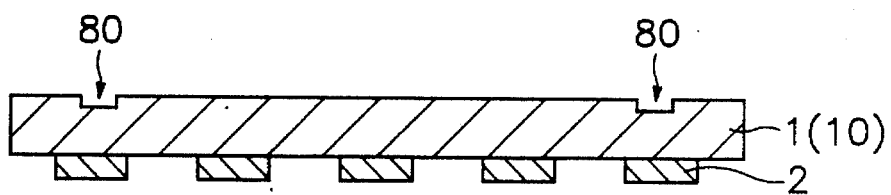

In FIG. 4C, the grooves 80 having a predetermined depth are formed by etching the glass substrate 1 with a hydrogen fluoride solution, to form a certain pattern for the grooves, is used as a mask.

The concentration of the hydrogen fluoride solution is 0.3 wt %, which is the most preferred concentration for the grooves of proper depth.

For example, when a glass substrate of 0.7 mm thickness is etched with a hydrogen fluoride solution of 0.3 wt % for about a minute, a groove is formed approximately 0.01 mm deep and 1 mm wide, which is the most preferred shape for strength and limits transformation of the glass substrate.

An additional process for making an LCD is in a conventional manner. That is, on the ITO transparent electrode layers 2 and 20 of the glass substrates 1 and 10 with the grooves 80 and 80A, orientation layers 3 and 30 for limiting the dielectric anisotropic characteristics of liquid crystal are formed.

After that, spacers 4 are scattered between the glass substrates 1 and 10, the sealant 6 is printed on the periphery of the glass substrates 1 and 10, and then the glass substrates are pressed under high temperature and sintered to produce a liquid crystal cell.

After the liquid crystal cell is filled up by the liquid crystal and sealed, polarizers 7 and 70 are adhered to the outer surfaces of the glass substrates 1 and 10, respectively, and then an LCD is completed, as shown in FIG. 1.

On the other hand, grooves 80 and 80A can be formed after forming the orientation layers 3 and 30.

Figure 5:
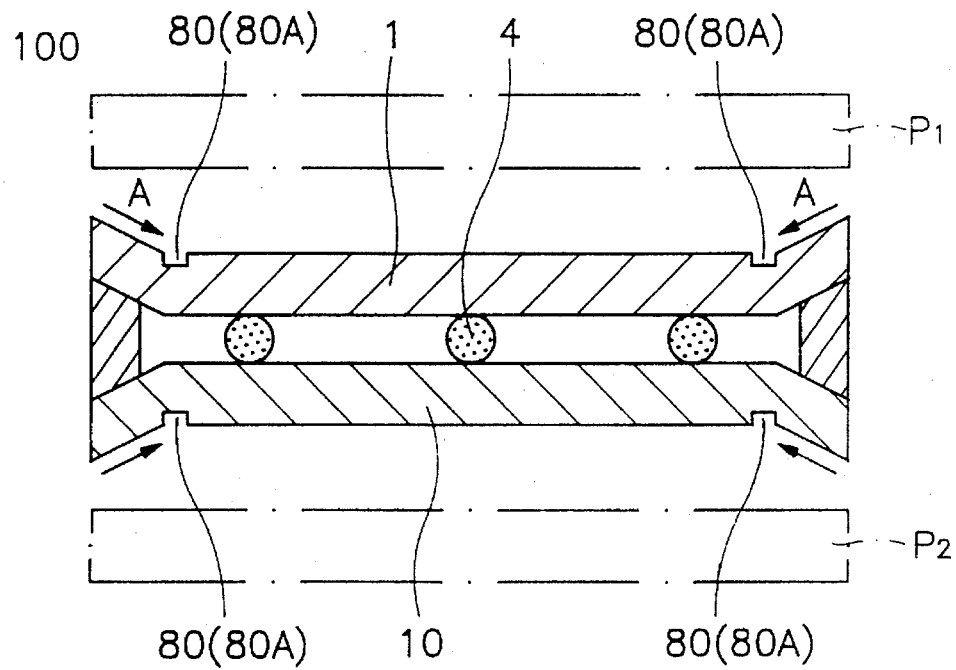
FIG. 5 is a sectional-side elevation views an LCD to help explain the maintenance of cell gap.

According to the present invention, it is possible to refrain the warping phenomenon of the substrates by providing glass substrates 1 and 10 having grooves 80 and 80A, which will be described more in detail in FIG. 5.

When two soda lime glass substrates 1 and 10 are pressed under high temperature by hot pressers $P_1$ and $P_2$, the glass substrates 1 and 10, the sealant 6 and the spacers 4 are pressed. Since the rate of expansion of the glass substrates 1 and 10 is about twice that of the sealant 6, when the pressure is released, the central portion of the substrates of a conventional LCD is expanded more than the peripheral area of the substrates, which looks like a convex lens.

But according to the present invention, the expansive force of the glass substrates 1 and 10 limited by the sealant 6 is inclined toward the direction of arrow A by an effect of the grooves 80 and 80A, therefore, the two glass substrates 1 and 10 are bent at the portion of the grooves 80 and 80A the toward inner side of the liquid crystal 100. The sealant 6 is sintered, under the condition that the glass substrates 1 and 10 are bent, to produce the liquid crystal cell 100.

Therefore, even though the pressure of the pressers $P_1$ and $P_2$ is removed, the cell gap between the two glass substrates 1 and 10 can be maintained uniformly by a reciprocal action of restoring the force of the spacers 4, and forces of close adhesion of the glass substrates 1 and 10 and the sealant 6.

According to the present invention, in the case of the LCD, especially bigger than 8", since the cell gap between the two glass substrates can be maintained uniformly, display of the LCD can be clearer than before.

Although preferred embodiments of the present invention have been described in detail hereinabove, it should be clearly understood that many variations and/or modifications of the basic inventive concepts herein taught which may appear to those skilled in the pertinent art will still fall within the spirit and scope of the present invention, as defined in the appended claims.

What is claimed is:

1. A liquid crystal display comprising:

a pair of soda lime glass substrates, each of said substrates having an open groove at an outer surface thereof;

a plurality of spacers disposed between said substrates;

a sealant for sealing said substrates; and a liquid crystal between said substrates.

2. A liquid crystal display according to claim 1 wherein said groove in each of said substrates is formed at an interior portion of a periphery defined by said sealant.

3. A liquid crystal display according to claim 1 wherein each said groove is continuous and quadrilateral.

4. A liquid crystal display according to claim 1 wherein the grooves are formed in the shape of two parallel lines, each line along a different opposite side of each of said substrates.

5. A method for manufacturing a liquid crystal display comprising the steps of:

applying a photoresister on the outer surfaces of two soda lime glasses each of which has an indium tin oxide transparent electrode layer or orientation layer;

exposing a portion of said glasses to a light through a mask;

etching the exposed portion of said glasses to produce a pattern on the glasses; and etching the patterned soda lime glasses with a hydrogen fluoride solution having 0.3 wt % concentration to produce glasses having grooves.

6. A method for forming a liquid crystal display wherein one of the steps of the method comprises hot pressing between a pair of hot presses a pair of soda lime glass substrates having sealant therebetween and comprising the additional step of introducing an open groove in an outer surface of each said substrate so that the open grooves are present at the time the pressure of the hot presses is removed from said substrates.

7. A method according to claim 6 wherein the step of introducing said grooves comprises forming said grooves at an interior periphery of said sealant on each said substrate.

8. A method according to claim 6 wherein the step of introducing said grooves comprises forming said grooves with a continuous quadrilateral shape.

9. A method according to claim 6 wherein the step of introducing a groove comprises the step of forming two parallel grooves, each of said grooves being formed along a different opposite side of each said substrate.

* * * * *

UNITED STATES PATENT AND TRADEMARK OFFICE
CERTIFICATE OF CORRECTION

PATENT NO. : 5,513,024
DATED : April 30, 1996
INVENTOR(S) : Jin-Kyu Kang

It is certified that error appears in the above-indentified patent and that said Letters Patent is hereby corrected as shown below:

```
Column 1, line 11, before "flat" delete "a".
Column 1, line 12, delete "up" (both occurrences).
Column 1, line 18, change "spacers" to -- spacer --.
Column 1, line 42, after "resulting" insert -- in --.
Column 2, line 9, before "uniform" change "an" to -- a --.
Column 2, line 21, change "photoresister" to --
    -- photoresistor --.
Column 2, line 37, change "elevations" to -- elevation --.
Column 2, line 41, change "views an" to -- view of an --.
Column 2, line 64, before "formed" delete"is".
Column 3, lines 27-28, change "photoresister" to
    -- photoresistor --.
Column 3, line 34, after "formed" replace "is"
    with -- are --.
Column 3, line 48, before "conventional" change "a"
    to -- the --.
Column 4, line 16, change "the toward" to -- toward the --.
Column 4, line 54, change "photoresister" to
    -- photoresistor --.
```

Signed and Sealed this

Twenty-fourth Day of June, 1997

*Attest:*

*Attesting Officer*

BRUCE LEHMAN

*Commissioner of Patents and Trademarks*